United States Patent
Prestridge

(10) Patent No.: US 7,490,868 B2
(45) Date of Patent: Feb. 17, 2009

(54) PIPE MATING SWIVEL ADAPTER FOR MISALIGNED JOINTS

(76) Inventor: John M. Prestridge, 1312 Angelia Cir., Bessemer, AL (US) 35020

( * ) Notice: Subject to any disclaimer, the term of this patent is extended or adjusted under 35 U.S.C. 154(b) by 0 days.

(21) Appl. No.: 11/486,199

(22) Filed: Jul. 13, 2006

(65) Prior Publication Data

US 2008/0012319 A1 Jan. 17, 2008

(51) Int. Cl.
 *F16L 27/00* (2006.01)
 *F16L 23/02* (2006.01)
(52) U.S. Cl. ........... 285/368; 285/263; 285/272; 285/275; 285/332.1; 285/332.3; 285/412
(58) Field of Classification Search ......... 285/332.1, 285/332.2, 332.3, 263, 272, 275, 278, 280, 285/281, 368, 412
See application file for complete search history.

(56) References Cited

U.S. PATENT DOCUMENTS

| | | | | |
|---|---|---|---|---|
| 592,681 A * | 10/1897 | Barnhart | ........... | 285/148.4 |
| 960,899 A | 6/1910 | Guyer | | |
| 1,607,254 A * | 11/1926 | Fantz | ........... | 285/332.1 |
| 2,661,965 A * | 12/1953 | Parmesan | ........... | 285/113 |
| 3,243,209 A * | 3/1966 | Chertok | ........... | 285/261 |
| 3,314,697 A * | 4/1967 | Freeman | ........... | 285/263 |
| 3,332,709 A * | 7/1967 | Kowalski | ........... | 285/23 |
| 3,425,716 A * | 2/1969 | Blau | ........... | 285/110 |
| 3,752,509 A * | 8/1973 | Stafford | ........... | 285/334.4 |
| 4,073,402 A * | 2/1978 | Wood | ........... | 220/203.08 |
| 4,195,865 A * | 4/1980 | Martin | ........... | 285/18 |
| 4,318,548 A | 3/1982 | Oberle et al. | | |
| 4,403,795 A | 9/1983 | Davlin | | |
| 4,647,084 A | 3/1987 | Hagin et al. | | |
| 4,659,116 A * | 4/1987 | Cameron | ........... | 285/27 |
| 4,696,494 A | 9/1987 | Schmitz et al. | | |
| 4,840,409 A * | 6/1989 | Welkey | ........... | 285/146.3 |
| 4,840,410 A * | 6/1989 | Welkey | ........... | 285/261 |
| 5,050,913 A * | 9/1991 | Lenz | ........... | 285/279 |
| 5,149,147 A | 9/1992 | Kastrup et al. | | |
| 5,362,229 A * | 11/1994 | Yamaga | ........... | 432/152 |
| 5,368,342 A * | 11/1994 | Latham et al. | ........... | 285/261 |
| 5,393,108 A * | 2/1995 | Kerr | ........... | 285/368 |
| 5,779,282 A * | 7/1998 | Ezze | ........... | 285/261 |
| 5,912,936 A * | 6/1999 | Charnley et al. | ........... | 376/282 |
| 5,924,747 A * | 7/1999 | Miyashita | ........... | 285/328 |
| 6,158,781 A * | 12/2000 | Aaron, III | ........... | 285/23 |
| 6,419,279 B1* | 7/2002 | Latham | ........... | 285/261 |
| 6,598,908 B1* | 7/2003 | Wosik | ........... | 285/334.5 |
| 2004/0046391 A1 | 3/2004 | Vasudeva | | |

* cited by examiner

*Primary Examiner*—James M Hewitt
(74) *Attorney, Agent, or Firm*—Bradley Arant Boult Cummings LLP

(57) ABSTRACT

A device and method variously and separately used for achieving a correction between the fluid-flow interfaces of the pipe segments, pump housings and valves in pipe systems when inserted therebetween.

6 Claims, 3 Drawing Sheets

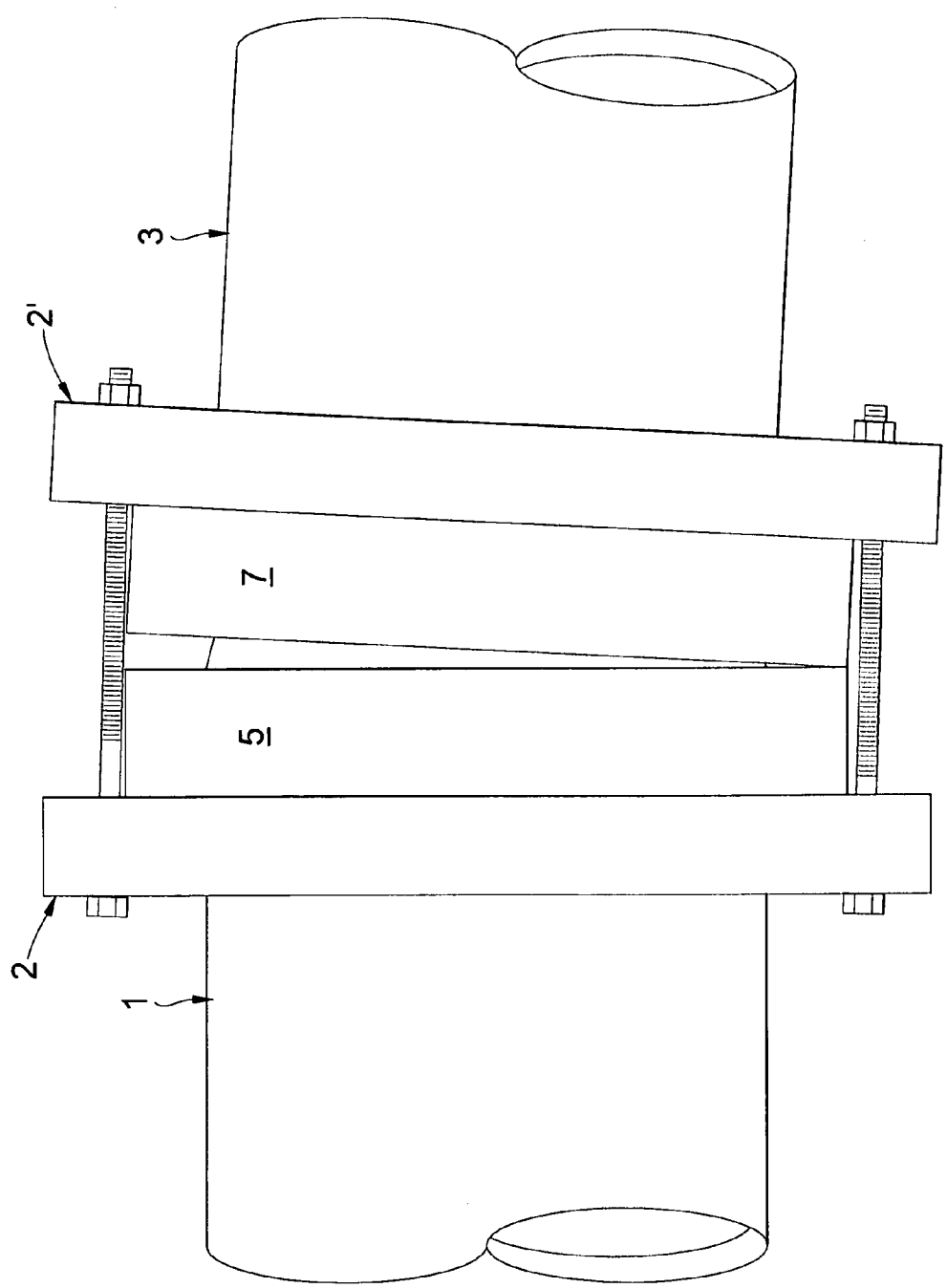

PIPE MATING SWIVEL ADAPTER FOR MISALIGNED JOINTS

BACKGROUND OF THE INVENTION

1. Field of the Invention

This invention relates generally to an apparatus for sealing off-axis abutments of flanged pipe ends, pump housings and valves. More specifically, but without limitation, the invention is directed toward a pipe mating swivel adapter for fitting between two flanged ends so as to create a seal when the pipes are misaligned.

2. Description of Related Art

Pipes for conveying materials such as fluids and slurries are often installed in applications in which perfect alignment of the central axes is difficult to achieve, often because of slight imperfections, distortions or irregularities in the fluid-flow interfaces of a pipe system. Fluid-flow interfaces in a pipe system may include pipe segments, pump housings and valves. Likewise, the flanges of the pipe segments, pump housings or valves may, due to manufacturing tolerances, not mate uniformly about the circumference of the pipe bores, even when the central axes are aligned. For example, the plane of a flange of a pipe segment may not be perfectly perpendicular to the pipe bore. Both of these circumstances are considered for purposes of this discussion to be non-exclusive examples of misalignments. It is known that bolts in mating flanges may be drawn up tightly to correct minor misalignment. However, in extreme cases of misalignment, it is not possible to create a sufficient seal by drawing up the bolts. Accordingly, a device is needed that will seal off-axis abutments, or other misalignments, of flanged end fluid-flow interfaces in pipe segments.

BRIEF SUMMARY OF THE INVENTION

The present invention is a device for improving the fluid-flow interfaces of a pipe system to prevent substantial leakage due to misalignment in the interfacing components of the pipe system. This improved interfacing is achieved utilizing the present invention through the insertion of a pair of mating disks as described hereinafter which can adjust to and compensate for misalignment due to the imperfections, distortions and irregularities or off-axis abutments which may otherwise exist between the interfacing portions to be joined in the pipe system.

OBJECTS OF THE INVENTION

An exemplary and non-exclusive alternative object of this invention is to provide an adapter designed to fit between fluid-flow interfaces in a pipe system to prevent substantial leakage due to misalignment, imperfections, distortions, irregularities or off-axis abutments in the interfacing components of said system.

Another exemplary and non-exclusive alternative advantage of the invention is to allow the utilization of fluid-flow interfaces which otherwise would not join consistently about the circumference of the passageway without having to take corrective action to eliminate the misalignment which prevents a good seal.

The above objects and advantages are neither exhaustive nor individually critical to the spirit and practice of the invention, except as stated in the claims as issued. Other alternative objects and advantages of the present invention will become apparent to those skilled in the art from the following description of the invention.

BRIEF DESCRIPTION OF THE DRAWINGS

FIG. 3 shows a profile view of an embodiment of the swivel adapter following completed installation, the mating disks having mated and achieved a desired sealing effect.

DETAILED DESCRIPTION OF THE INVENTION

The following is a detailed exemplary description of an embodiment of the invention, in a number of its various aspects. Those skilled in the art will understand that the specificity provided herein is intended for illustrative purposes with respect to an exemplary embodiment, only, and is not to be interpreted as limiting the scope of the invention or claims.

The shown embodiment is a pipe mating swivel adapter for misaligned pipes or flanges of pipe segments. As may be seen from the figures, the adapter is made to sandwich between two flanged pipe ends. Traditionally, these flanged pipe ends would directly abut one another, and such direct abutment is, of course, still the simplest way of joining the pipe segments where one can do so without leakages at the joining interfaces. However, where off-axis installation or other misalignments may cause leakages, the present invention provides a simple, inexpensive, and in-field feasible solution that does not require rejection of all irregular segments or expensive and time consuming modifications to improve the abutting flanges. The present embodiment also prevents breakage of the flanges due to over tightening of the bolts providing for less costly repairs and down time. Such considerations are very important in certain contexts, such as in underground mining.

In an alternative embodiment, the pipe mating swivel adapter is designed to fit between a pump housing and a pipe segment or other interface in a pipe system. A flanged pipe end of the pipe segment or other interface and a flange of the pump housing traditionally directly abut one another. However, off-axis installation or misalignments due to manufacturing variations in the pump housing may cause leakages. The present invention would compensate for misalignments and prevent leakages in the piping system. In another variation of the embodiment, the pipe mating swivel adapter is designed to fit between a flange of a valve and a flanged end of a pipe segment or other interface of a pipe system to compensate for misalignments and prevent leakages in the piping system.

Figure 1:
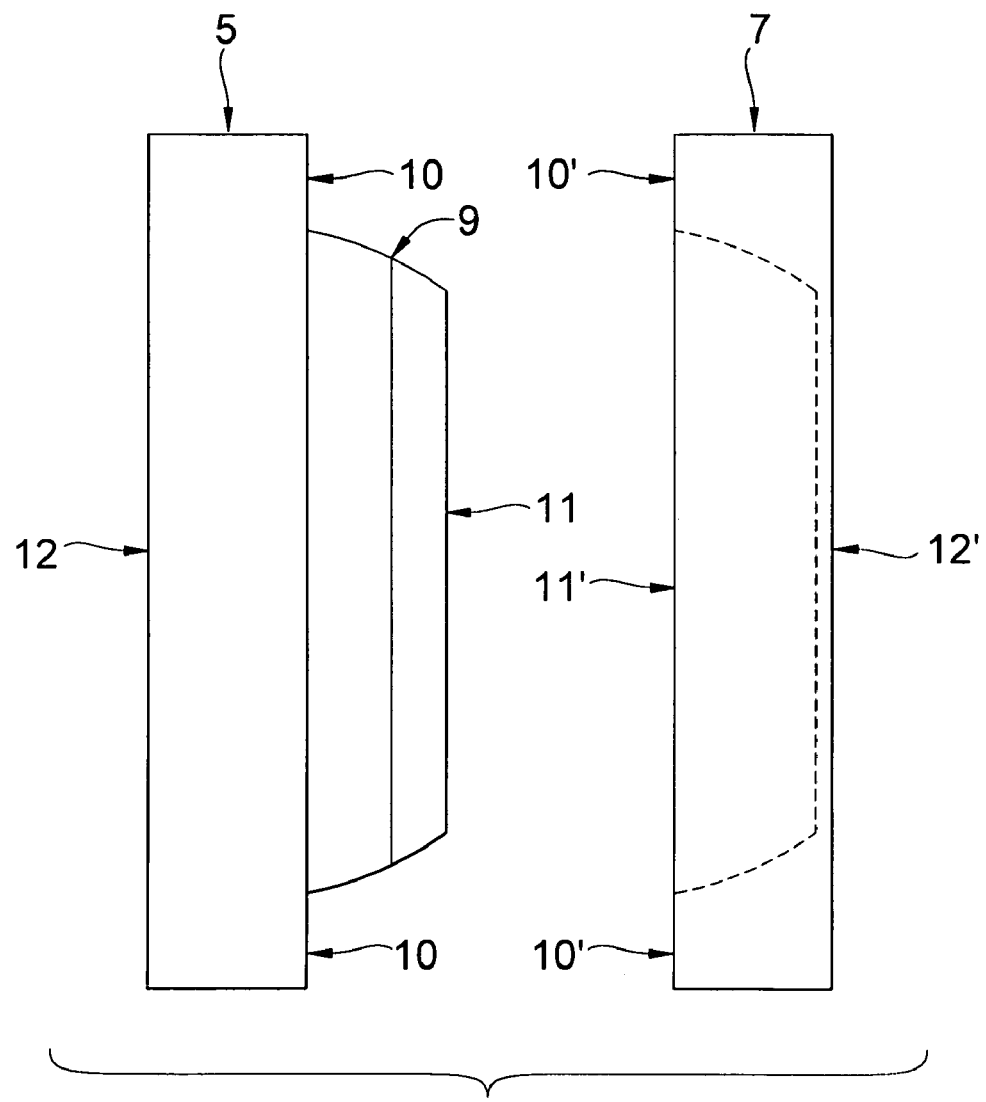
FIG. 1 shows a profile view of an embodiment of the mating disks prior to mating.

As shown in FIG. 1, the swivel adapter comprises two ring-like disks of mechanically strong material. The disks have inner surfaces 10 and 10', respectively, and outer surfaces 12 and 12', respectively. The inner surface 10 of the first disk 5 has a protrusion 11 which acts as a male component of the swivel adapter. The inner diameter of the protrusion 11 defines a central opening, or bore, passing therethrough, which bore cooperates with the bore of the pipe segments to continue the passage of fluid or materials. The outer diameter of the protrusion increases from its terminating edge (which installation, as described more fully below, would be farthest within the female second disk 7). In the shown embodiment, the profile of the protrusion 11 is radiussed, or curved, such that if the surface were drawn to continue across the bore, the end of the protrusion would form a semi or hemi spherical shape with a hole passing through it. Of course, because of the presence of the bore, the protrusion is only a portion of a spherical shape, and therefore is referred to hereinafter as having a frustospherical configuration. The male frustospherical protrusion 11 has a groove 9 running about its surface that is adapted to receive an O ring. The inner surface 10' of the second disk 7 has a frustospherical depression 11' which acts as a female component of the swivel adapter. The frustospherical depression 11' in the second disk 7 in the shown embodiment is complimentary in curvature to the male protrusion 11 of the first disk 5 so that said male protrusion 11 will fit within, and mate with, the female depression 11' of the second disk 7. In an alternative, the depression 11' may not be precisely complimentary, but could be configured to have a slightly smaller radius of curvature from the male protrusion 11. In another alternative, the protrusion 11 may form the entirety of the inner surface 10 of the disk 5 such that one can eliminate the portion of inner surface 10 shown as substantially perpendicular to the pipe bore in the Figures.

Figure 2:
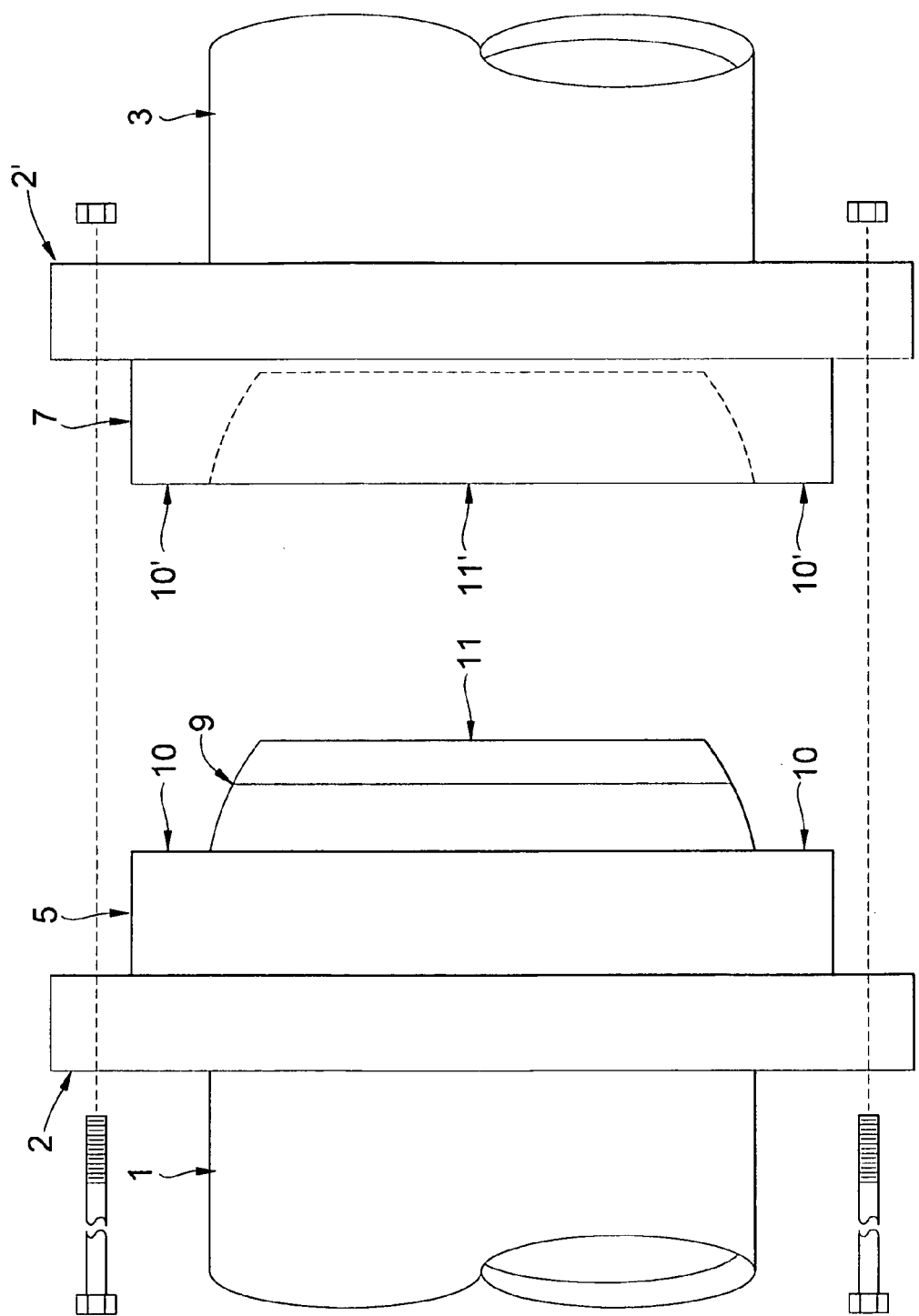
FIG. 2 shows a profile view of an embodiment of the mating disks in place against flanges of pipe segments prior to the actual mating of the two disk components.

Referring to FIG. 2, when the swivel adapter is in place between the two pipe segment flanges 2 and 2', the flange 2 of pipe 1 abuts the outer surface 12 of the first disk 5, and the flange 2' of pipe 3 abuts the outer surface 12' of the second disk 7. There may be a gasket inserted between the flanges 2 and 2' and the outer surfaces 12 and 12' of the disks 5 and 7. In the shown embodiment, the inner diameter of the disks 5 and 7 is approximately the same as the inner diameter of the pipe segments.

When an O ring is inserted in gasket groove 9 it acts as a sealing gasket. When there is misalignment, the adapter with the gasket aids in providing an effective seal between the fluid-flow interfaces in a pipe system.

Referring to FIG. 3, the flanged pipe ends 2 and 2' are misaligned and the swivel adapter is inserted therebetween and the flanges 2 and 2' are tightened by connecting bolts or other means causing the swivel adapter to assume a compensating position that automatically adjusts to maintain the desired seal notwithstanding the misalignment. The seal is maintained because such adjustment is permitted by the mating disks 5 and 7 with inclusion of the O ring. It may be noted that in the shown embodiment the connecting bolts do not pass through the disks 5 and 7. The bolts are configured so as to center the adapter between the flange ends. While it would be possible to configure either or both of the disks 5 and 7 to allow connecting bolts to pass through the disks, the shown configuration is believed preferable from at least a standpoint of manufacturing ease.

The two disks 5 and 7 are so constructed that the interface of the connecting pipe segments 1 and 3 may be angled up to several degrees without affecting the sealing function.

CONCLUDING REMARKS

The invention has numerous particular embodiments, the scope of which shall not be restricted further than the claims. Unless otherwise specifically stated, applicant does not by consistent use of any term in the detailed description in connection with an illustrative embodiment intend to limit the meaning of that term to a particular meaning more narrow than that understood for the term generally in the art.

I claim:
1. A pipe mating swivel adapter comprising:
   a first disk and a second disk insertable between a first flanged pipe segment and a second flanged pipe segment, unattached to either segment, designed to be held between said segments only by the pressure of fastened flange bolts, with no flange bolt passing through any part of either disk, wherein:
   (i) the first disk has an inner surface having a frustospherical protrusion with a groove configured to receive an O ring to circumscribe a portion of the protrusion and having an outer surface designed to abut the first flanged segment;
   (ii) the second disk has an inner surface having a frustospherical depression designed to mate with the frustospherical protrusion of the first disk and having an outer surface designed to abut the second flanged segment; and
   (iii) the first and second disks may be swiveled and rotated against each other to achieve a seal.

2. The pipe mating swivel adapter as described in claim 1 wherein the groove retains an O ring.

3. The pipe mating swivel adapter as described in claim 1, wherein the frustospherical protrusion has substantially the same radius as the frustospherical depression.

4. The pipe mating swivel adapter as described in claim 1, wherein the frustospherical protrusion has a diameter smaller than the frustospherical depression.

5. The pipe mating swivel adapter as described in claim 2, wherein the frustospherical protrusion has substantially the same radius as the frustospherical depression.

6. The pipe mating swivel adapter as described in claim 2, wherein the frustospherical protrusion has a diameter that is smaller than the diameter of the frustospherical depression, to an extent not exceeding the diameter of the O ring.

\* \* \* \* \*